United States Patent
Chung

(10) Patent No.: US 10,480,964 B2
(45) Date of Patent: *Nov. 19, 2019

(54) OPTICAL NAVIGATION DEVICE

(71) Applicant: PIXART IMAGING INC., Hsin-Chu (TW)

(72) Inventor: Ching-Lin Chung, Hsin-Chu (TW)

(73) Assignee: PIXART IMAGING INC., Hsin-chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/436,002

(22) Filed: Jun. 10, 2019

(65) Prior Publication Data

US 2019/0293457 A1 Sep. 26, 2019

Related U.S. Application Data

(63) Continuation of application No. 15/149,301, filed on May 9, 2016, now Pat. No. 10,359,300.

(30) Foreign Application Priority Data

Dec. 23, 2015 (TW) .............................. 104143358 A

(51) Int. Cl.
*G06F 3/033* (2013.01)
*G01D 5/26* (2006.01)

(52) U.S. Cl.
CPC ..................................... *G01D 5/26* (2013.01)

(58) Field of Classification Search
CPC ...... G06F 1/3259; G06F 3/033; G06F 3/0346; G06F 3/0354; G06F 3/03541; G06F 3/03543; G06F 3/0312; G06F 3/0317; G06F 3/03362; G06F 3/03549; G06F 3/0213; G06F 1/169; G06F 1/1643; G06F 3/0428; G06F 3/0421; G06F 3/0423; H01H 19/001; G01D 5/26

See application file for complete search history.

(56) References Cited

U.S. PATENT DOCUMENTS

| 2010/0078545 A1* | 4/2010 | Leong | G06F 3/03543 250/221 |
| 2012/0133956 A1* | 5/2012 | Findlay | H03K 17/941 356/614 |
| 2015/0212208 A1* | 7/2015 | Hanada | H01L 31/0203 250/221 |

* cited by examiner

*Primary Examiner* — Lunyi Lao
*Assistant Examiner* — Jarurat Suteerawongsa
(74) *Attorney, Agent, or Firm* — Li & Cai Intellectual Property (USA) Office

(57) ABSTRACT

An optical navigation device has a light-emitting unit, an optical navigation chip and a cover. The light-emitting unit provides a light to a surface of a displacement generating unit. The optical navigation chip has a sensing array, but excludes any optical lens for focusing a reflected light. The sensing array disposed opposite to the surface of the displacement generating unit receives the reflected light which the light provided by the light-emitting unit is reflected from the surface of the displacement generating unit. The cover has a first surface and a second surface, and an angle is formed between the cover and the optical navigation chip, to prevent another reflected light from the surface of the first surface of the cover from entering the sensing array. Particularly, the angle formed between the cover and the optical navigation chip is from 10 degrees to 15 degrees.

11 Claims, 6 Drawing Sheets

OPTICAL NAVIGATION DEVICE

CROSS-REFERENCE TO RELATED APPLICATIONS

The present disclosure is a Continuation Application claiming the benefit of and priority to U.S. patent application Ser. No. 15/149,301, filed on May 9, 2016, and entitled "OPTICAL NAVIGATION DEVICE," now pending, the entire contents of each of which being incorporated herein by reference.

BACKGROUND

1. Technical Field

The instant disclosure relates to an optical navigation device; in particular, to an optical navigation device without any optical lens for focusing a reflected light.

2. Description of Related Art

Currently, the "holeless" design has been applied to lots of optical navigation devices to provide a great protection against dust. Generally speaking, these optical navigation devices have optical lenses to prevent the reflected light which the light is generated by the light source and reflected from the cover from entering the sensing array, wherein the reflected light from the cover entering the sensing array causes interferences that decrease the sensing accuracy. However, if the distance between the light source and the image sensor decreases, it will be hard to prevent the reflected light from the cover from entering the sensing array just by disposing the optical lens. Therefore, for the "holeless" optical navigation device without any optical lens, one other specific design should be required to prevent the reflected light which the light is generated by the light source and reflected from the cover from entering the sensing array.

SUMMARY

The instant disclosure provides an optical navigation device comprising a light-emitting unit, an optical navigation chip and a cover. The light-emitting unit emits a light to a surface of a displacement generating unit. The optical navigation chip comprises a sensing array. The sensing array excludes any optical lens for focusing a reflected light, and is disposed opposite to the surface of the displacement generating unit to receive a reflected light which the light is reflected from the surface of the displacement generating unit. The cover has a first surface and a second surface, wherein an angle is formed between the cover and the optical navigation chip to prevent another reflected light from the first surface of the cover from entering the sensing array of the optical navigation chip.

In one embodiment of the instant disclosure, the angle formed between the cover and the optical navigation chip is from 10 to 15 degrees.

In one embodiment of the instant disclosure, a distance between the cover and the sensing array of the optical navigation chip is less than a distance between the cover and the light-emitting unit.

To sum up, in the optical navigation device provided by the instant disclosure, an angle is formed between the cover and the optical navigation chip. Thus, without expending the device volume, the other reflected light from the first surface of the cover is efficiently prevented from directly entering the sensing array of the optical navigation chip to cause interferences that will influence the sensing result. Thereby, the optical navigation device provided by the instant disclosure is dust-proof, can prevent the interferences and has a small volume.

For further understanding of the instant disclosure, reference is made to the following detailed description illustrating the embodiments of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

It will be understood that, although the terms first, second, third, and the like, may be used herein to describe various elements, but these elements should not be limited by these terms. These terms are only to distinguish one element from another region or section discussed below could be termed a second element without departing from the teachings of the instant disclosure. As used herein, the term "and/or" includes any and all combinations of one or more of the associated listed items.

One Embodiment of an Optical Navigation Device

Figure 1A:
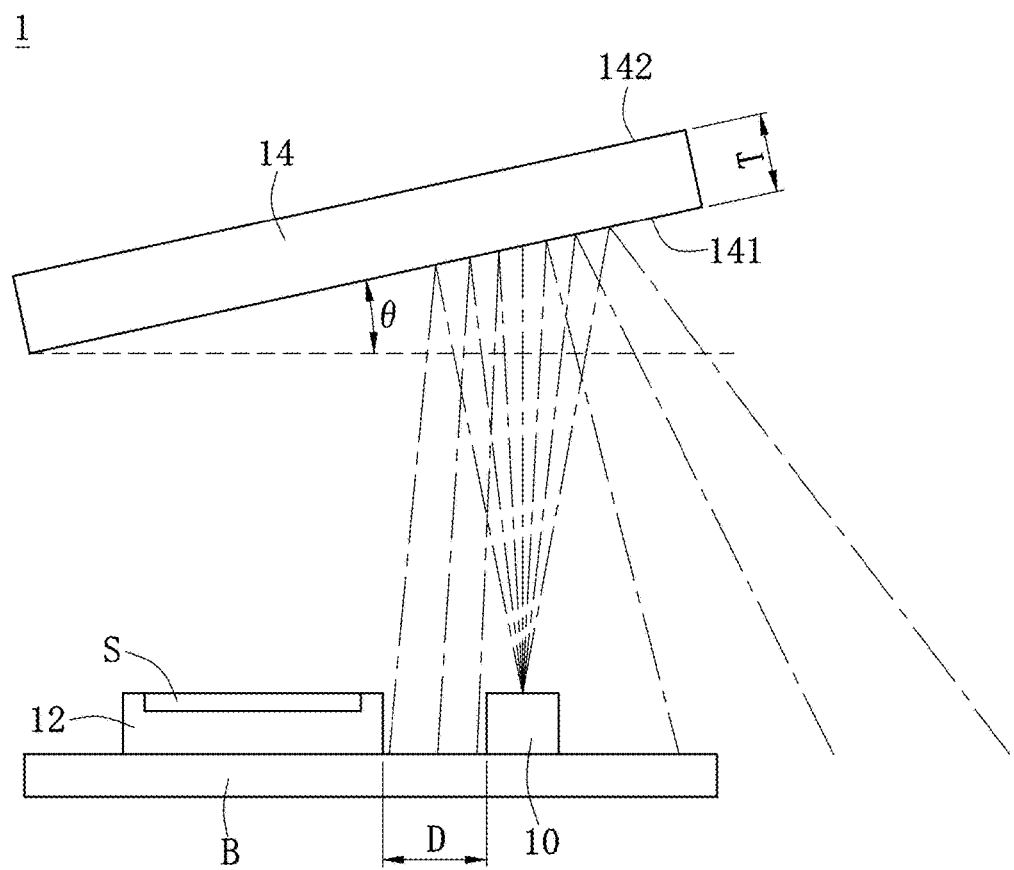
FIG. 1A shows a schematic diagram of an optical navigation device of one embodiment of the instant disclosure.

FIG. 1A shows a schematic diagram of an optical navigation device of one embodiment of the instant disclosure. As shown in FIG. 1A, the optical navigation device 1 comprises a light-emitting unit 10, an optical navigation chip 12 and a cover 14. The light-emitting unit 10 and the optical navigation chip 12 are both disposed on a substrate B. The light-emitting unit 10 emits a light to the surface of a displacement generating unit (not shown). The optical navigation chip 12 comprises a sensing array, and there is a distance D between the sensing array S and the light-emitting unit 10. In addition, the sensing array S is disposed opposite to the surface of the displacement generating unit, to receive a reflected light which the light is generated by the light and reflected from the surface of the displacement generating unit. It should be noted that, in this embodiment, the sensing array S does not have any optical lens (i.e. excludes any optical lens) for focusing the above mentioned reflected light (i.e. the reflected light from the surface of the displacement generating unit). The cover 14 prevents dusts from falling on the surface of the optical navigation chip 12. The cover 14 has a first surface 141 and a second surface 142, and the cover 14 has a thickness T.

Figure 1B:
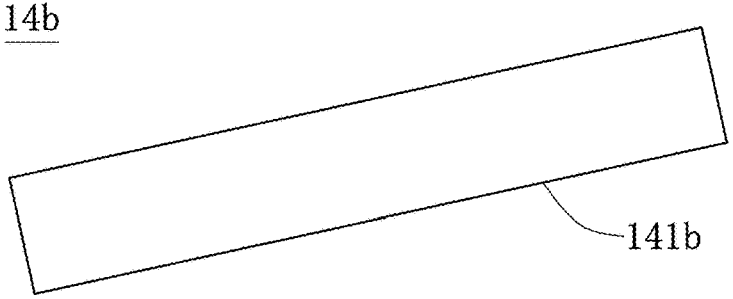
FIGS. 1B through 1D respectively show schematic diagrams of covers of optical navigation devices of different embodiments of the instant disclosure.
Figure 1C:
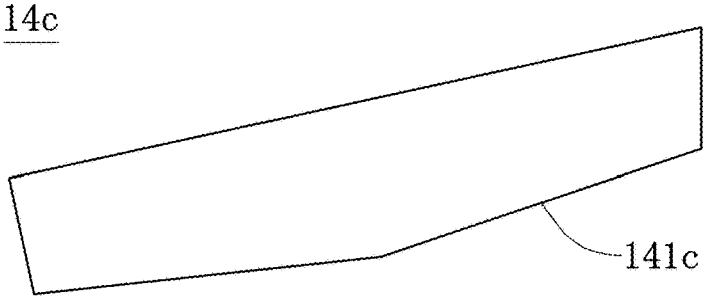
Figure 1D:
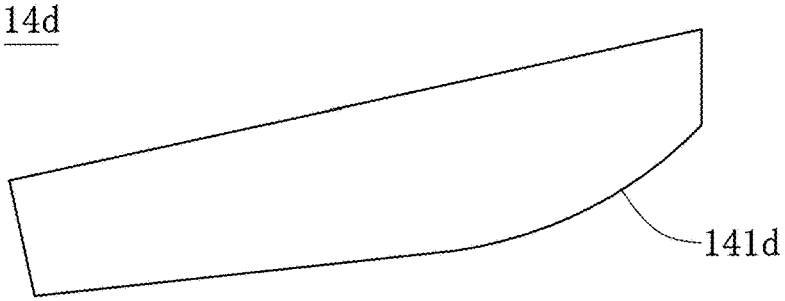

Refer to FIGS. 1B through 1D, FIGS. 1B through 1D respectively show schematic diagrams of covers of optical navigation devices of different embodiments of the instant disclosure. As shown in FIG. 1B, the cover 14b is plate-shaped and has a thickness. That is, the first surface 141b of the cover 14b only has one slope. For example, the thickness of the cover 14b is from 0.5 mm to 1 mm. In another embodiment, the first surface 141c is polygonal-curved, as shown in FIG. 1C. That is, the first surface 141c of the cover 14c has at least two different slopes, and thus is polygonal-curved. In still another embodiment, part of the first surface 141d of the cover 14d is curved and has its curvature, as shown in FIG. 1D. That is, part of the first surface 141d of the cover 14d is a curved surface. It should be noted that, the embodiments shown in FIGS. 1B through 1D are only for illustrating each implementation related to the cover 14 of the optical navigation device 1 in each embodiment, but not for restricting the instant disclosure.

It is worth mentioning that, in the optical navigation device 1 in this embodiment, an angle θ is formed between the cover 14 and the optical navigation chip (i.e. the angle θ is the angle which the disposing plane of the optical navigation device 1 intercepts the disposing plane of the cover 14), to prevent another reflected light which the light is generated by the light-emitting unit 10 and reflected from the first surface 141 of the cover 14 from partly entering the sensing array S of the optical navigation chip 12. Thus, no interferences are induced to influence the sensing result.

Again refer to FIG. 1A, in this embodiment, the light-emitting unit 10 emits the light to the surface of a displacement generating unit, to sense the displacement of the displacement generating unit. The displacement generating unit can be a mouse roller, but it is not limited herein. However, the optical navigation device 1 has a cover 14 functioning as a dust-proof device, and thus, the light reaches the first surface 141 of the cover 14 before the light emitted by the light-emitting unit 10 reaches the surface of the displacement generating unit. Therefore, the light will be partly reflected by the first surface 141 of the cover 14.

Figure 2:
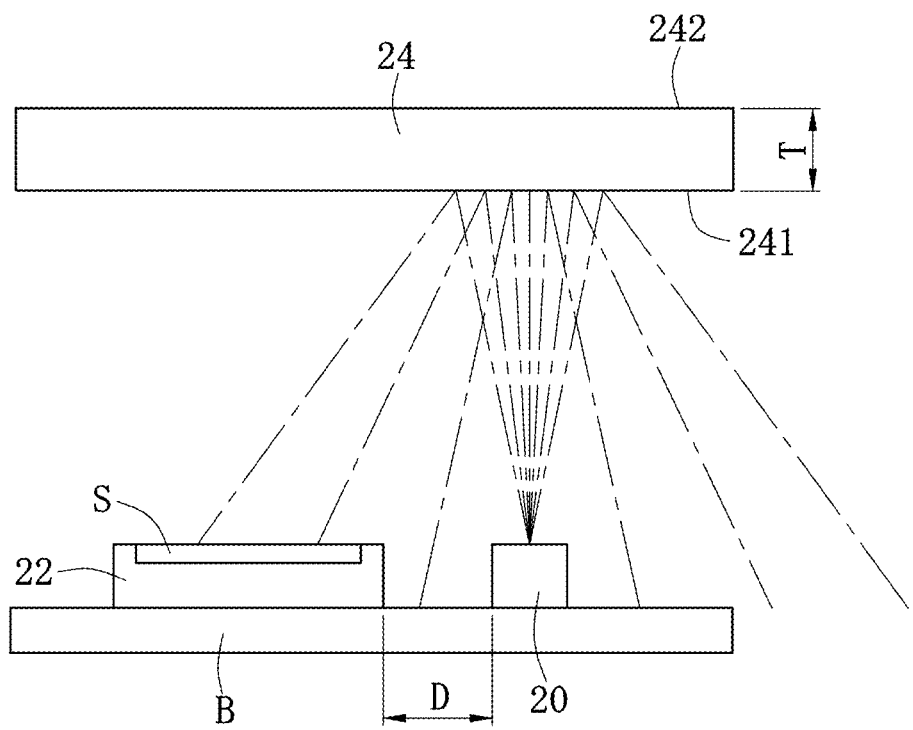
FIG. 2 shows a schematic diagram of an optical navigation device comprising a cover and an optical navigation chip that have no angle formed therebetween.

In conjunction with FIG. 1A and FIG. 2, FIG. 2 shows a schematic diagram of an optical navigation device comprising a cover and an optical navigation chip that have no angle formed therebetween. The difference between the optical navigation device 1 in this embodiment shown in FIG. 1A and the optical navigation device 2 is that, the cover 24 and the optical navigation chip 22 are disposed in parallel in the optical navigation device 2, as shown in FIG. 2. Once the light-emitting unit 20 emits light toward the displacement generating unit (not shown), before the light reaches the surface of the displacement generating unit, the light first reaches the first surface 241 of the cover 24. Thus, the light is partly reflected from the first surface 241 of the cover 24, wherein part of the reflected light enters (i.e. is received by) the sensing array S. As described above, the sensing array S should receive the reflected light from the surface of the displacement generating unit, but not the reflected light from the first surface 241 of the cover 24. If the reflected light from the first surface 241 of the cover 24 enters the sensing array S, interferences will be induced to decrease the sensing accuracy.

To avoid the interferences, in the optical navigation device 1 of this embodiment, an angle θ is formed between the cover 14 and the optical navigation chip 12. Even though the light first reaches the first surface 141 of the cover 14 before the light reaches the surface of the displacement generating unit, and partly reflected from the first surface 141 of the cover 14, the angle θ formed between the cover 14 and the optical navigation chip 12 can be used to effectively prevent the reflected light from the first surface 141 of the cover 14 from entering the sensing array S. Thereby, the induced interferences that decrease the sensing accuracy will be avoided.

Figure 3A:
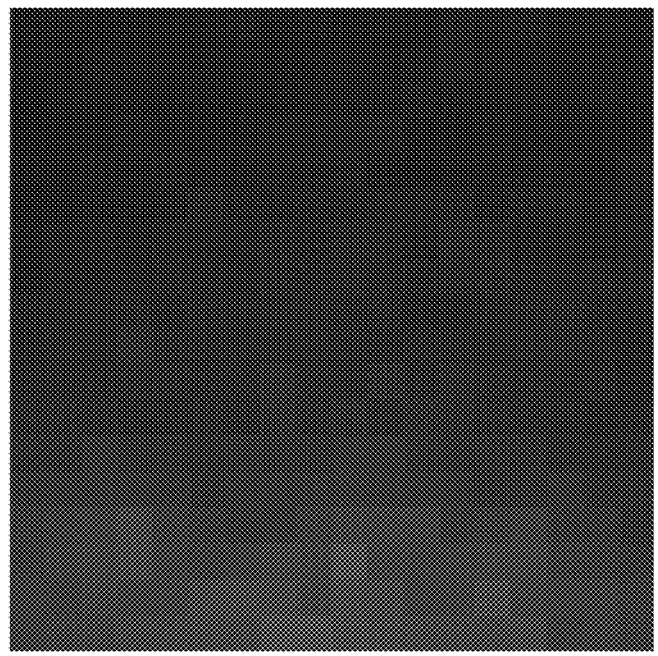
FIGS. 3A and 3B respectively show energy distribution diagrams generated by sensing arrays of optical navigation devices shown in FIG. 1A and FIG. 2.
Figure 3B:
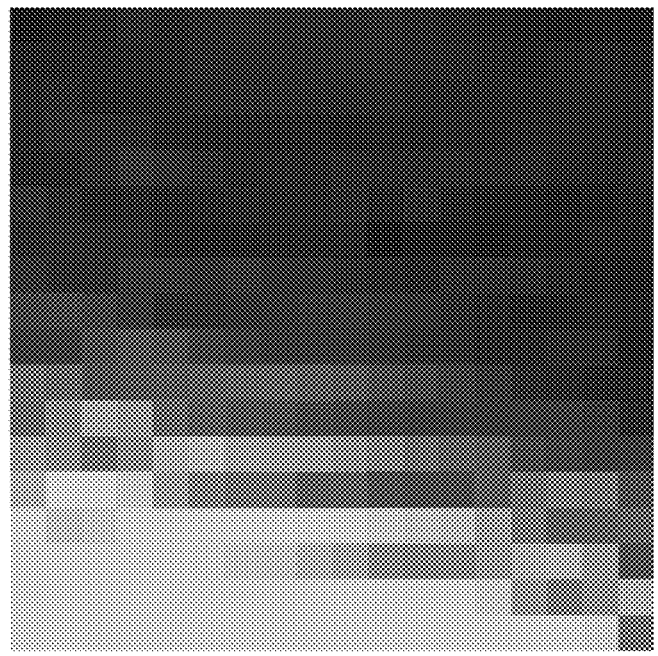

In conjunction with FIG. 3A and FIG. 3B, FIGS. 3A and 3B respectively show energy distribution diagrams generated by sensing arrays of optical navigation devices shown in FIG. 1A and FIG. 2. For the optical navigation device 2 having the cover 24 and the optical navigation chip 22 disposed in parallel, according to the energy distribution diagram shown in FIG. 3B, part of the reflected light from the first surface 241 of the cover 24 actually enters the sensing array S. On the contrary, for the optical navigation device 1 having an angle between the cover 14 and the optical navigation chip 22, according to the energy distribution diagram shown in FIG. 3A, none of the reflected light from the first surface 141 of the cover 14 enters the sensing array S. In other words, all of the reflected light from the first surface 141 of the cover 14 goes outside between the sensing array S and the light-emitting unit 10, and then is reflected out. Thus, in this embodiment, the angle θ formed between the cover 14 and the optical navigation chip 12 can prevent the reflected light from the first surface 141 of the cover 14 from entering the sensing array S.

It should be noted that, in this embodiment, an angle θ is formed between the cover 14 and the optical navigation chip 12, so the distance between the cover 14 and the sensing array S is less than the distance between the cover 14 and the light-emitting unit 10. In one preferred embodiment, the angle θ formed between the cover 14 and the optical navigation chip 12 is from 10 to 15 degrees, and in another preferred embodiment, the angle θ formed between the cover 14 and the optical navigation chip 12 is 12.5 degrees. However, it is not limited herein.

It should be also noted that, in this embodiment, the light-emitting unit 10 is a coherent light source, and thus the light provided by the light-emitting unit 10 is a coherent light. That is, the light provided by the light-emitting unit 10 has great temporal coherence and spatial coherence, and has unitary color and uni-directivity. In one preferred embodiment, the optical navigation device 1 having no optical lens for focusing the reflected light from the surface of the displacement generating unit, so a divergence angle where the intensity of the coherent light is 50% of its center intensity is from 16 to 18 degrees, such as 17 degrees, such that the reflected light from the surface of the displacement generating unit will be effectively sensed.

It is worth mentioning that, in this embodiment, the angle θ formed between the cover 14 and the optical navigation chip 12 is related to the divergence angle where the intensity of the coherent light is 50% of its center intensity. In details, the divergence angle of the coherent light is related to its reflection and transmittance in respect to a surface. Thus, the smaller the divergence angle of the coherent light provided by the light-emitting unit 10 is, such as 16 degrees, the smaller the angle θ formed between the cover 14 and the optical navigation chip 12 can be. On the contrary, the larger the divergence angle of the coherent light provided by the light-emitting unit 10 is, such as 18 degrees, the larger the angle θ formed between the cover 14 and the optical navigation chip 12 is.

In addition, in this embodiment, the cover 14 of the optical navigation device is made of a light transmitting material, such as polycarbonate (PC), ABS resin, or the IR pass, to transmit the light, but it is not limited herein. Moreover, in the optical navigation device 1 in this embodiment, the sensing array S of the optical navigation chip 12 is a complementary metal-oxide-semiconductor (CMOS) sensing array, but it is also not limited herein.

Another Embodiment of the Optical Navigation Device

In the following embodiment, there are only parts different from those of the embodiment in FIG. 1A described, and the omitted parts are indicated to be identical to those of the embodiment in FIG. 1A. In addition, for an easy instruction, similar reference numbers or symbols refer to elements alike.

Figure 4:
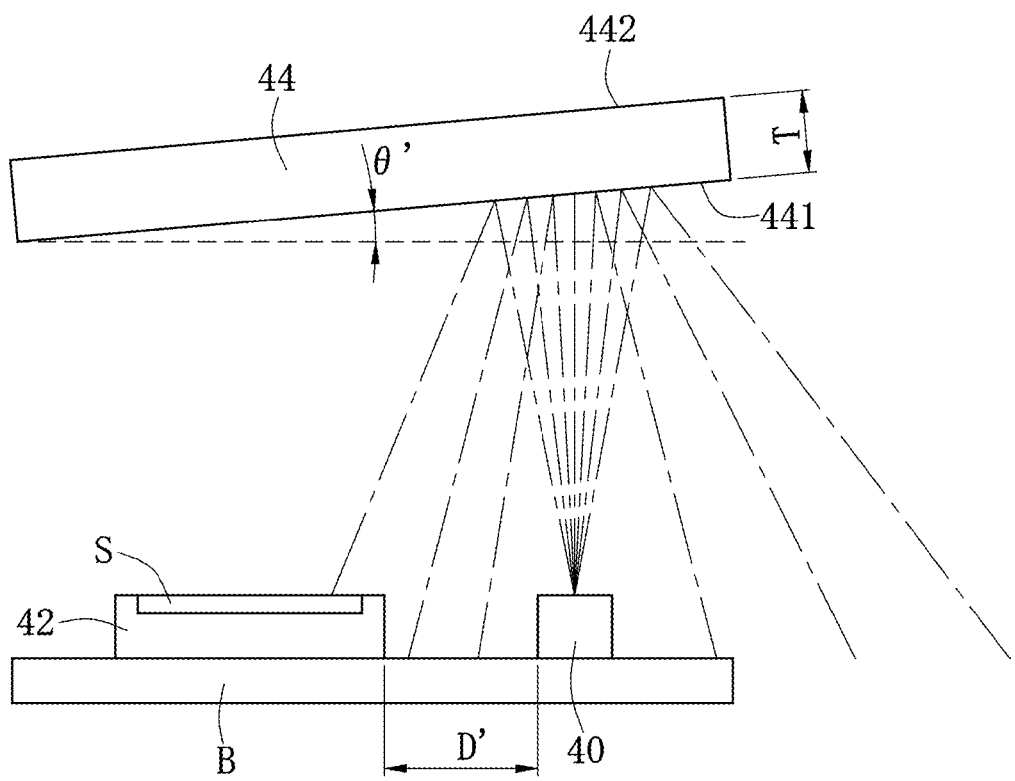
FIG. 4 shows a schematic diagram of an optical navigation device of another embodiment of the instant disclosure.
Figure 5:
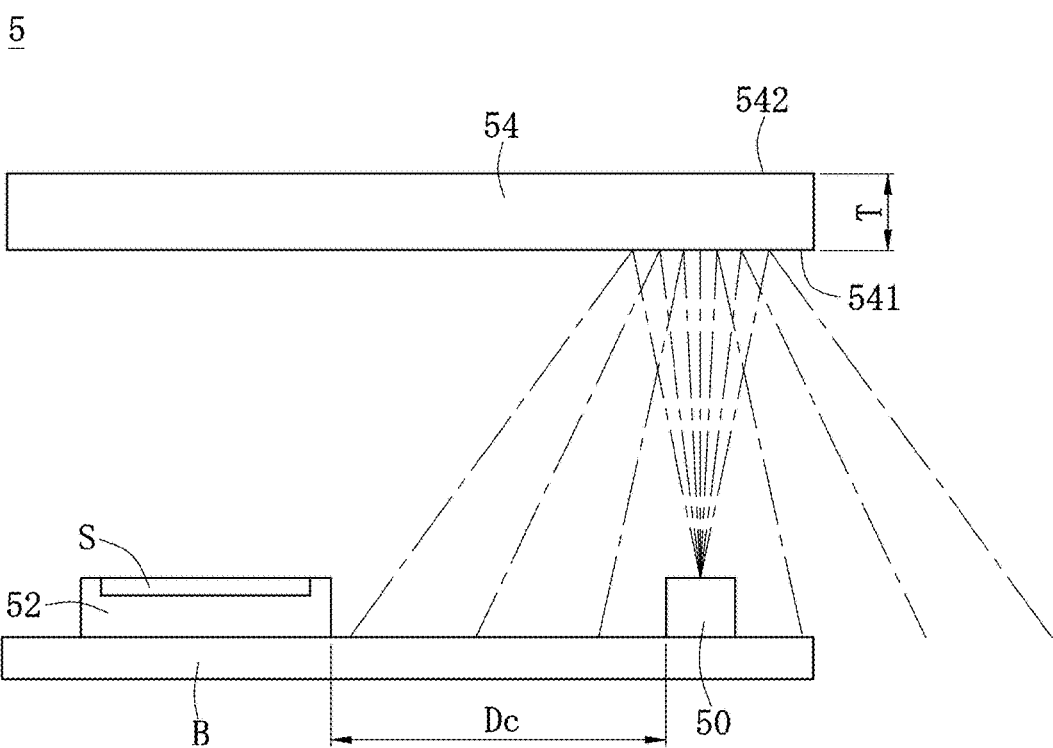
FIG. 5 shows a schematic diagram of an optical navigation device of still another embodiment of the instant disclosure.

In conjunction with FIG. 4 and FIG. 5, FIG. 4 and FIG. 5 respectively show schematic diagrams of optical navigation devices of other embodiments of the instant disclosure. The difference between the optical navigation device 4 in this embodiment and the optical navigation device 1 in the above described embodiment is that, in this embodiment, the distance D' between the sensing array S of the optical navigation chip 42 and the light-emitting unit 40 is adjustable.

Specifically, in this embodiment, in addition to the divergence angle of the coherent light provided by the light-emitting unit 40, the angle θ' formed between the cover 44 and the optical navigation chip 42 is also related to the distance D' between the sensing array S of the optical navigation chip 42 and the light-emitting unit 40.

In details, as shown in FIG. 4, if the distance D' between the sensing array S of the optical navigation chip 42 and the light-emitting unit 40 increases, the possibility that the light reflected from the first surface 441 of the cover 44 enters the sensing array S will decrease. That is, the reflected light from the first surface 441 of the cover 44 enters the sensing array S can be decreased by adjusting the distance D'. Thus, even though the angle θ' formed between the cover 44 and the optical navigation chip 42 is small, such as 10 degrees or less than 10 degrees, the light reflected from the first surface 441 of the cover 44 can be prevented from entering the sensing array S via adjusting the distance D'. On the contrary, if the distance D' between the sensing array S of the optical navigation chip 42 and the light-emitting unit 40 decreases, the possibility that the reflected light from the first surface 441 of the cover 44 enters the sensing array S will increase. That is, the reflected light reflected from the first surface 441 of the cover 44 enters the sensing array S more. Thus, under this circumstance, the included angle θ' formed between the cover 44 and the optical navigation chip 42 should increase, such as 15 degrees or larger than 15 degrees, to prevent the reflected light from the first surface 441 of the cover 44 from entering the sensing array S.

As shown in FIG. 5, once the distance D' between the sensing array S and the light-emitting unit 40 increases to a critical distance Dc, the reflected light from the first surface 441 of the cover 44 cannot enter the sensing array S. In other words, increasing the distance D' between the sensing array S and the light-emitting unit 40 to the critical distance Dc can prevent the reflected light from the first surface 441 of the cover 44 from entering the sensing array S. Thereby, in this embodiment, in order to prevent the reflected light from the first surface 441 of the cover 44 from entering the sensing array, selectively, the cover 44 and the optical navigation chip 42 can have an angle formed therebetween or be disposed in parallel (if the distance D' increases to the critical distance Dc).

To sum up, in the optical navigation device provided by the instant disclosure, there is an angle formed between the cover and the optical navigation chip. Thus, without expending the device volume, another reflected light which the light is generated by the light source and refelected from the first surface of the cover is efficiently prevented from directly entering the sensing array of the optical navigation chip to cause interferences that influence the sensing result. Thereby, the optical navigation device provided by the instant disclosure is dust-proof, can prevent the interferences and has a small volume.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. An optical navigation device, comprising:
   a light-emitting unit, emitting a light to a surface of a displacement generating unit;
   an optical navigation chip, comprising:
   a sensing array, excluding any optical lens for focusing a reflected light, disposed opposite to the surface of the displacement generating unit, receiving a reflected light which the light is reflected from the surface of the displacement generating unit; and
   a cover, having an inner surface and an outer surface, wherein a geometric structure is formed by the cover, the optical navigation chip, and the light-emitting unit, wherein the inner surface of the cover is polygonal-curved and has at least two different slopes to direct another reflected light reflected by the inner surface of the cover away from entering the sensing array of the optical navigation chip.

2. The optical navigation device according to claim 1, wherein the light-emitting unit is a coherent light source for providing a coherent light.

3. The optical navigation device according to claim 2, wherein a divergence angle where the intensity of the coherent light is 50% of its center intensity is from 16 to 18 degrees.

4. The optical navigation device according to claim 1, wherein an angle formed between the cover and the optical navigation chip is from 10 to 15 degrees.

5. The optical navigation device according to claim 1, wherein an angle between the cover and the optical navigation chip is 12.5 degrees.

6. The optical navigation device according to claim 1, wherein a distance between the cover and the sensing array of the optical navigation chip is less than a distance between the cover and the light-emitting unit.

7. The optical navigation device according to claim 1, wherein a distance between the light-emitting unit and the sensing array of the optical navigation chip is adjustable.

8. The optical navigation device according to claim 1, wherein part of the inner surface of the cover is curved and has its curvature.

9. The optical navigation device according to claim 1, wherein the cover is made of a light transmitting material.

10. The optical navigation device according to claim 1, wherein the sensing array of the optical navigation chip is a complementary metal-oxide-semiconductor (CMOS) sensing array.

11. The optical navigation device according to claim 1, wherein the cover is plate-shaped and a thickness of the cover is from 0.5 mm to 1 mm.

* * * * *